Patented Aug. 11, 1942

2,292,389

UNITED STATES PATENT OFFICE 2,292,389

METHOD OF TREATING LIGNOCELLULOSIC MATERIAL AND PRODUCT PRODUCED THEREBY

John G. Meiler, Wausau, Wis., assignor to Marathon Paper Mills Company, Rothschild, Wis., a corporation of Wisconsin No Drawing. Application November 14, 1941, Serial No. 419,212

8 Claims. (Cl. 106—123)

The present invention relates to improvements in a process for treating lignocellulosic material such as wood and the like in order to convert same into products useful for molding purposes. The invention also relates to new and useful products made by said method.

The present invention contemplates treating lignocellulose materials with an alkaline solution of predetermined concentration and digesting the treated materials under definitely controlled conditions of pH, temperature and time of cooking so as to produce a product having the desired plasticity and flow suitable for molding under heat and pressure.

In accordance with my invention, lignocellulosic material such as wood is digested under mildly alkaline conditions for a relatively short period of time to impart a pulping action to the material without deleteriously affecting the lignin or the fiber strength. This alkaline digestion continues until the acids developed neutralize the alkali, and thereafter the digestion continues under acid conditions for a relatively long period of time as compared with the aforesaid alkaline digestion period. During the acid digestion period, the material acquires the desired conditions of plasticity and flow suitable for molding under heat and pressure to form a product of high wet and dry strength.

The total period of digestion is largely dependent upon the temperature and pressure utilized. With a comparatively low temperature and pressure say with a temperature in the order of about 170° to 200° C. and a pressure in the order of about 200 lbs. per square inch, the total period of digestion may be in the order of about 2 hours. With a comparatively higher temperature and pressure, say with a temperature approximately corresponding to a pressure of steam of about 1000 lbs. per square inch, the total period of digestion may be in the order of about 3½ minutes. In general, conditions of temperature and pressure are so controlled that the total digestion period does not exceed about 2½ to 3 hours, although I prefer that the digestion be completed within a considerably shorter period of time.

During this total digestion period, the lignocellulosic material is digested under alkaline conditions for a portion of the time and then under acid conditions for the remainder of the time. In all instances, the digestion is carried out under acid conditions for a major portion of the time. The alkali aids in preventing the cook from becoming too acid during the comparatively short period of total digestion and thus assists in assuring that the digested material, when further treated as hereinafter described, will be capable of being molded under heat and pressure to form a dense, hard, dark colored, tough, non-brittle product.

The quantity of alkali sufficient for our purpose will vary with the character of the lignocellulosic material used. In general, the quantity of alkali used is such that when the lignocellulose material is digested as aforesaid, the acidity of the completed cook is in the order of a pH of about 6.5 and lower as hereinafter described. We prefer to use a quantity of readily soluble alkaline material equivalent to that of about 3.4% to about 7.96% of sodium hydroxide, based on the dry weight of the lignocellulose material containing 34% moisture (on an air dry weight basis, this is equal to about 3% to about 7%). Smaller amounts may be used, if desired, say down to an amount equivalent to that of about 0.88% to 1.14% of sodium hydroxide, based on the dry weight of the lignocellulose material containing 34% moisture (about 0.75% to 1% on an air dry weight basis). Larger amounts should be avoided, in general, since any appreciably larger amount of alkali in excess of the upper limit above stated will decrease the plasticity of the material and the resulting molded products have a higher water absorption. In addition, large amounts of alkali above the limits stated prevent the completion of the digestion in a commercially feasible time.

The conditions of temperature, pressure and time can be controlled readily, for a given lignocellulosic material and a given amount of alkali, to produce a final molded product having the desired balance of strength and water-resistance suitable for commercial purposes. An important factor necessary to achieve this purpose is the control of the quantity of alkaline material used. By controlling the quantity of alkaline material to an amount sufficient to be neutralized by the acids developed during digestion and to produce in the digested material a pH between about 4 to 4.5 on one hand and about 6.5 on the other, and by further controlling this quantity to insure that the alkaline material is completely neutralized by the acids developed in a relatively short period of the total digestion time, the desired moldable product may be formed.

I have found after considerable experimentation that it is desirable to limit the digestion treatment so as to avoid an acidity substantially greater than that represented by pH of about 4.5 in order to secure products of commercial uniformity and superior usefulness since within the range of a pH of about 4.5 to 6.5 there results a digested product which can be readily washed without serious loss of fine water-insoluble material containing valuable resinous components. Also, within this pH range, the use of a higher temperature of treatment during the cooking process may be maintained, with consequent improved results, than with a substantially lower pH.

In order that the invention may be better understood the following examples are given as illustrative procedures:

treated as in Example 3, but the molding pressure was 2000 lbs. The dry strength of the molded product was 6350 lbs. per square inch, the wet strength 5870 lbs. per square inch and its moisture absorption on 24 hours of soaking was 2.42%.

To further illustrate the effect of variations in pH on the properties of the final molded product, a series of digestions and the properties of the final molded products are given in the following Table I which includes the aforementioned Example 2, as cook 3.

Table I

| Cook | Digestion | | | Final pH | Washing characteristic | Beating time in minutes | Percent water absorption, 24 hr. soaking | Transverse strength, lbs. per sq. in. | |
|---|---|---|---|---|---|---|---|---|---|
| | Time in secs. to 600 lbs./sq. in. | Time in secs. to 1,000 lbs./sq. in. | Time in secs. at 1,000 lbs./sq. in. | | | | | Dry | Wet |
| 1 | 30 | 5 | 60 | 7.2 | Slow cloudy | 20 | 15.0 | 19,000 | 18,000 |
| 2 | 30 | 5 | 120 | 6.4 | Clear slow | 20 | 4.8 | 14,000 | 14,000 |
| 3 | 30 | 5 | 180 | 5.2 | Fast clear | 20 | 1.6 | 14,000 | 14,000 |

*Example 1.*—A charge consisting of 100 lbs. dry weight of hardwood sawdust containing 34% moisture (equivalent to about 113.8 lbs. air dry weight of hardwood sawdust) and 75 lbs. of a 10% sodium hydroxide solution is mixed in a rod mill. The material so mixed is then charged into a rotating digester (5 R. P. H.) and cooked with direct steam at 200° C. and at a pressure of 200 lbs. per square inch until a liquid sample drawn from the digester gives a pH of about 5.0. The digester is then blown and the product is washed, refined, and sheeted in a manner customarily used in the paper industry.

*Example 2.*—A charge prepared as in Example 1 is placed in a digester and the pressure is raised with direct steam to 600 lbs. per square inch in 30 seconds. The pressure is then raised to 1,000 lbs. per square inch in 5 seconds, and maintained at that pressure for about 180 seconds. The charge is then blown, having a final pH of about 5.2 and is washed, refined, and sheeted as in Example 1.

*Example 3.*—A charge consisting of 4000 grams air dry weight of wood flour, 40 grams $Na_2CO_3$ and 15 liters of water was mixed in a rod mill. The mixture was charged in a rotating digestor as in Example 1 and cooked with direct steam at a temperature of about 176°–180° C. and at a pressure of about 120 lbs. per square inch for about 2 hours. A liquid sample drawn from the digester at that time gave a pH of about 5.40. The product was removed from the digester, washed, dried to a moisture content of from about 5 to 6% and then molded for 10 minutes at a pressure of 4000 lbs. per square inch and at a temperature corresponding with 120 lbs. steam pressure. The resulting molded product was hard, dense and dark colored, had a dry transverse strength of 7290 lbs. per square inch and a wet transverse strength of 6700 lbs. per square inch.

*Example 4.*—A charge consisting of 3000 grams air dry weight of wood flour, 60 grams $NH_4OH$ (2% $NH_3$) and 4 gallons of water was mixed and digested as in Example 3 for about 2 hours at a temperature of about 173°–174° C. and at a pressure of about 140 lbs. per square inch. A sample gave a pH of about 4.5. The product was then The same method of mixing and ratio of alkali to lignocellulose were employed in the cooks given in Table I, and the products were washed, refined, and sheeted in the same way and the resulting sheets were molded in the presence of a plasticizer at a temperature of 185° C. and a pressure of 2000 lbs. per square inch. It is advantageous that the blown product, after washing, be in such condition that it can be refined. The wet transverse strength of the molded product was determined by soaking a sample for 24 hours in water at room temperature, allowing it to dry for a similar period at room temperature then testing its strength.

These tests show that the molded products made according to my invention have a greatly improved water resistance which can be attributed to continuing the digestion after the charge had become acid for a definitely controlled and limited time. This improvement in water resistance is largely a result of an increased plasticity of the material and a more uniform character of the molded product. The transverse breaking strength of the molded product is affected by the subsequent refining treatment as well as by the cooking conditions. We have been able, for example, to make molded products having strengths of 16,000–18,000 lbs. per square inch by suitably refining the material produced under the cooking conditions given for No. 3 in Table I. A lowering of the pH below about 4.5 is undesirable since it results in loss in strength and more brittle products even though the material is more plastic.

As a result of these and other tests I have found that I can obtain superior products by adjusting the amounts of alkali used and controlling the pH during the treatment of the lignocellulosic material to give a final pH within the range from about a pH 4.5 to about a pH of 6.5. Where some brittleness in the final molded product is not objectionable, the pH of the cook may be carried to about 4.

In order to more clearly bring out the novel features and the importance of controlling the pH within this range, the following comparative cooks were made. In the first cook wood chips were digested about 8 hours at 200° C. with sufficient alkali to give a final pH of about 6.9. In a second cook the same raw materials were used under similar digesting conditions, except that less alkali was used, but the digestion was carried out for only 2 hours, the final pH being 5.0 and because of the rapid initial neutralization of the alkali, the digestion in this second cook was carried on the acid side from about 1¼ to 1½ hours. The products of these two digestions were refined in a beater under identical conditions and the resulting pulps were then formed into sheets, dried to a moisture content of from 5–6% and molded at a temperature of 185° C. and pressure of 2,000 lbs. per square inch.

The molded product (sample No. 1) produced from the pulp of the first digestion was not uniform, had transverse strengths of 12,000–18,000 lbs. per square inch for different test pieces, and water absorptions after 24 hours soaking of 8–15%. These wide variations and the physical appearance of the soaked samples indicate that the pulp of the first cook had insufficient plasticity. The molded product (sample No. 2) produced from the pulp of the second digestion was uniformly black in color, had transverse strengths of 12,000–13,000 lbs. per square inch and water absorptions after 24 hours soaking of less than 1.5%.

It is thus evident from the wide variations in strength and poor water resistance that the product made like sample No. 1 is not best suited for commercial purposes and requires the addition of other resins to increase its plasticity, or the use of excessively high molding pressures. On the other hand, a material having sufficient plasticity to give uniform products having relatively high strength and water resistance of the sample No. 2 is suitable for commercial purposes.

An alkaline solution containing lignin can be utilized for the digestion of lignocellulose under the definitely controlled conditions of time, temperature and pH as herein disclosed, whereby the lignin is precipitated and becomes a resin constituent of the resulting product. Thus the ultimate resin content, by which I mean the ligneous and resinous constituents of the original lignocellulose and the precipitated ligneous and resinous constituents of the alkaline lignin solution, is greater than the ultimate resin content of the same type of lignocellulose digested under identical conditions of heat and pressure but using, for example, sodium hydroxide instead of the alkaline solution containing lignin.

In general any lignin is suitable for use provided such lignin is dispersible in alkali solution and upon acidification precipitates products having resinous properties. For economic and other reasons some sources of lignin having these characteristics are preferred over others. The alkaline waste liquors commonly called "black liquor" resulting from the making of paper pulp by the soda, sulphate (kraft) and other alkaline pulping processes are a convenient source of lignin for use in this invention because they contain lignin having the necessary characteristics. Such liquors are alkaline and contain practically all the ligneous and resinous constituents of the original wood in solution or dispersion and these constituents precipitate upon acidification to yield a product having resinous properties. Hence these waste alkaline liquors are my preferred source of resin for use in this invention and incidentally a source of some or all of the alkali required for the digestion of the lignocellulose.

The lignin in these waste alkaline liquors precipitates on acidification and thereby serves to enrich the resulting product in resin constituents or resin effect with its resulting benefits. As an example, wood flour containing approximately 5% moisture is mixed with two and one-half times its weight of concentrated kraft black liquor. To this charge is added enough water to make a fluid mixture and the entire mass is placed in an externally heated autoclave. The pressure in the autoclave is brought up to 200 lbs. per square inch and maintained for two hours. The autoclave is then cooled and the resulting digested product having a final pH of about 6.2 is washed with water, air dried and molded.

Various other alkaline black liquors can be substituted for the kraft black liquor in the above sample. Chips or various wood wastes can be used instead of wood flour and it is to be understood that I do not wish to limit this invention to the treatment of wood as any lignocellulosic material can be treated by my process.

The extent of the lignin enrichment will depend largely upon the amount of black liquor used and it is possible by my process to increase the ultimate resin content of the resulting digested mass by 50–100%. I therefore have a very effective and inexpensive method of increasing the lignin content of a material, thereby producing a satisfactory product for making molded products having improved water resistance, strength and hardness.

I have found that for each temperature of treatment and for each ratio of alkali to lignocellulose there is a rather definite pH value above which the digested material cannot be satisfactorily washed. This, for example, is illustrated by a comparison of cooks No. 1 and No. 3 given in Table I. Both these cooks where made with hardwood sawdust impregnated with a 10% solution of NaOH in water equivalent to 75% of the dry weight of the wood. The material of cook No. 1 having a final digestion period of 60 seconds at 1,000 lbs. per square inch pressure and a final pH of 7.2 did not wash satisfactorily, since the wash water became cloudy due to the dispersion of the more resinous water-insoluble portion of the material which could not be retained by a coarse filter cloth and clogged a fine filter cloth. The loss of this fine insoluble material is a serious matter since a loss of even 2% of it materially reduces the plasticity of the remaining material. The material from cook No. 3 having a final digestion time of 180 seconds at 1,000 lbs. per square inch and a final pH of 5.2, washed satisfactorily without such a loss of resinous material. It filtered fast and the filtrate was clear even when a coarse duck filter cloth was used.

I have also found that by impregnating the subdivided lignocellulosic material with the aqueous alkali solution preparatory to cooking I am able to reduce the dilution of the alkali and that the use of more concentrated alkali together with the action of steam increases the plasticity of the product and facilitates subsequent operations by retaining the resin within the digested material. I preferably use a caustic alkali solution such as sodium hydroxide, but I may also use any alkaline solutions such as, for example, solutions of sodium carbonate, sodium acetate, and other compounds which give alkaline reactions in aqueous solution.

I have found that higher cooking temperatures are desirable rather than undesirable provided the pH is controlled. For example, a digestion starting with the same raw material, the same ratio of alkali to lignocellulose and ending at the same pH carried out at 285° C. will produce a more plastic product than a similar digestion carried out at 185° C.

After the product of the digestion is washed to remove water soluble material it may be ground and dried, or first dried and then ground, a suitable plasticizer added thereto if necessary, and the resultant produce used as a molding composition or the washed product may be refined in the paper-making sense to a pulp and the pulp formed in any well-known manner into sheets of suitable thickness. The sheeted product containing a plasticizer may be molded singly or made into laminated molded articles in the usual way.

In order to produce a satisfactory molding product it is necessary that the material contain a plasticizer in definite amounts. Water serves as an excellent plasticizer when present in amounts from about 2% to 10% by weight of the dry product. Other plasticizers may be used such as phenols, e. g., phenol, cresol, xylenol, etc.; mono or polyhydroxy alcohols, e. g., ethyl alcohol, glycol, glycerine, etc.; and hydroxy compounds and solvents for the ligneous resin, e. g., acetone, cellosolve (ethylene glycol monoethyl ether), etc. Resins, fillers, pigments, etc., may also be incorporated in the washed, ground, or refined product. Furthermore, the sheeted product may be used as the fibrous base in making saturated papers, for example, it may be used in the making of paper impregnated with phenolic resins by passing the sheet through the regular phenolic resins bath and processing in the usual manner.

The plasticity of the sheeted or subdivided product may be readily controlled by the amount of moisture or other plasticizer present in the sheet or subdivided product during the molding operation. In general, it is desirable to work with a product having as low moisture content as possible. Most satisfactory results have been obtained with water content between the range of about 3.5% to 7% by weight of the dry product; a water content of over 10% produces an inferior product. The sheeted product dried in air under the ordinary conditions will retain from about 4 to 7% moisture which serves as a plasticizer. If desired, the product may be dried to remove substantially all moisture present and a definite amount of water then added to serve as a plasticizer. In general, the water plasticizer can be replaced in part or entirely by any of the aforementioned plasticizers.

It is to be understood that numerous changes and modifications may be made in the process and product produced thereby without departing from the spirit of the invention and it is intended to broadly include such variations and modifications as defined in the appended claims except as they may be restricted by the prior art.

This application is a continuation-in-part of my copending applications Serial Nos. 183,826 and 183,827, both filed January 7, 1938.

I claim:

1. The process of treating a lignocellulose material for producing a product capable of being molded under heat and pressure in the presence of a plasticizer to form a product having a high wet and dry strength and of low water absorption which comprises digesting lignocellulose material under an elevated temperature and pressure with an alkaline aqueous solution containing a predetermined amount of an alkaline material sufficient to be neutralized by the acids developed during digestion and to permit of the attainment of a pH between about 4.0 and 6.5 in the digesting material for a relatively long portion of the total digestion time with a final pH not below about 4.0, the amount of the alkaline material being such that it is completely neutralized by the acids developed during digestion in a relatively short portion of the digestion time, and washing and drying the digested material.

2. The process of treating a lignocellulose material for producing a product capable of being molded under heat and pressure in the presence of a plasticizer to form a product having a high wet and dry strength and of low water absorption which comprises digesting lignocellulose material under an elevated temperature and pressure with an aqueous alkaline solution containing a predetermined amount of caustic soda sufficient to be neutralized by the acids developed during digestion and to permit of the attainment of a pH between about 4.0 and 6.5 in the digesting material for a relatively long portion of the total digestion time with a final pH not below about 4.0, the amount of the alkaline material being such that it is completely neutralized by the acids developed during digestion in a relatively short portion of the total digestion time, washing and drying the resultant material.

3. The process of treating a lignocellulose material for producing a product capable of being molded under heat and pressure in the presence of a plasticizer to form a product having a high wet and dry strength and of low water absorption which comprises digesting lignocellulose material under an elevated temperature and pressure with an aqueous alkaline solution containing a predetermined amount of an alkaline material sufficient to be neutralized by the acids developed during digestion and to permit of the attainment of a pH between about 4.5 and 6.5 in the digesting material for a relatively long portion of the total digestion time with a final pH not below about 4.5, the amount of the alkaline material being such that it is completely neutralized by the acids developed during digestion in a relatively short portion of the total digestion time, and washing and air drying the digested material.

4. The process of treating a lignocellulose material for producing a product capable of being molded under heat and pressure in the presence of a plasticizer to form a product having a high wet and dry strength and of low water absorption which comprises digesting lignocellulose material under an elevated temperature and pressure with an aqueous alkaline solution containing a predetermined amount of an alkaline material sufficient to be neutralized by the acids developed during digestion and to permit of the attainment of a pH between about 4.5 and 6.5 in the digesting material for a relatively long portion of the total digestion time with a final pH not below about 4.5, the amount of the alkaline material being such that it is completely neutralized by the acids developed during digestion in a relatively short portion of the total digestion time, washing the resulting material, and drying the washed material to a moisture content of from about 2 to 10% by weight of dry product.

5. The process of treating lignocellulose material for producing a product capable of being molded under heat and pressure in the presence of a plasticizer to form a product having a high wet and dry strength and of low water absorption which comprises digesting lignocellulose material under an elevated temperature and pressure with an aqueous alkaline solution containing a predetermined amount of an alkaline material sufficient to be neutralized by the acids developed during digestion and permit of the attainment of a pH between about 4.5 and 6.5 in the digesting material for a relatively long portion of the total digestion time with a final pH not below about 4.5, the amount of the alkaline material being such that it is completely neutralized by the acids developed during digestion in a relatively short portion of the total digestion time, washing the resultant material, drying, and adding thereto about 2 to 10% of a plasticizer by weight of dry material.

6. The process of treating lignocellulose material to make a product capable of being molded under heat and pressure in the presence of a plasticizer to form a product having high wet and dry strength and low water absorption which comprises digesting lignocellulose material under elevated temperature and pressure with an alkaline aqueous solution containing an alkaline compound in controlled amount until reaching an acidity between pH about 4.5 and 6.5, the amount of alkaline compound present in the digesting solution being such that it will neutralize only part of the acidity developed during the digestion and thereby permit of establishing and maintaining the aforesaid acid pH condition during the final major portion of the digestion period, and washing and drying the resultant solids.

7. The process of treating lignocellulose material to make a product capable of being molded under heat and pressure in the presence of a plasticizer to form a product having high wet and dry strength and low water absorption which comprises digesting lignocellulose material under elevated temperature and pressure with an alkaline aqueous solution containing in controlled amount an alkaline compound and dispersed lignin substance resulting from an alkaline pulping of lignocellulose material until reaching an acidity between pH about 4.5 and 6.5, the amount of alkaline compound present in the digesting solution being such that it will neutralize only part of the acidity developed during the digestion and thereby permit of establishing and maintaining the aforesaid acid pH condition during the final major portion of the digestion period, and washing and drying the resultant solids.

8. The process of treating lignocellulose material to make a product capable of being molded under heat and pressure in the presence of a plasticizer to form a product having high wet and dry strength and low water absorption which comprises digesting lignocellulose material under elevated temperature and pressure with an alkaline aqueous solution containing in controlled amount an alkaline compound and dispersed lignin substance until reaching an acidity between pH about 4.5 and 6.5, the amount of alkaline compound present in the digesting solution being such that it will neutralize only part of the acidity developed during the digestion and thereby permit of establishing and maintaining the aforesaid acid pH condition during the final major portion of the digestion period, and washing and drying the resultant solids.

JOHN G. MEILER.